United States Patent [19]

Huang et al.

[11] Patent Number: 5,649,168
[45] Date of Patent: Jul. 15, 1997

[54] COMPUTER PROGRAM PRODUCT FOR A QUERY PASS THROUGH IN A HETEROGENEOUS DISTRIBUTED DATA BASE ENVIRONMENT

[75] Inventors: Caroline Josette Huang, San Jose; Yun Wang, Saratoga, both of Calif.

[73] Assignee: International Business Machines Corporation, Armonk, N.Y.

[21] Appl. No.: 475,841

[22] Filed: Jun. 7, 1995

Related U.S. Application Data

[62] Division of Ser. No. 310,799, Sep. 29, 1994.
[51] Int. Cl.$^6$ .............................. G06F 13/14; G06F 15/16
[52] U.S. Cl. ........................... 395/500; 395/612; 395/613
[58] Field of Search .................................. 395/500, 600, 395/612, 613, 614, 616; 364/282.1, 282.4, 283.3, 260

[56] References Cited

U.S. PATENT DOCUMENTS

| | | | |
|---|---|---|---|
| 4,714,989 | 12/1987 | Billings | 364/200 |
| 4,714,995 | 12/1987 | Materna et al. | 364/200 |
| 4,881,166 | 11/1989 | Thompson et al. | 364/200 |
| 5,058,000 | 10/1991 | Cox et al. | 364/200 |
| 5,142,470 | 8/1992 | Bristow et al. | 364/184 |
| 5,161,158 | 11/1992 | Chakravarty et al. | 371/15.1 |

(List continued on next page.)

OTHER PUBLICATIONS

Clement T. Yu et al., "Query Processing in a Fragmented Relational Distributed System: Mermaid," *IEEE Trans. on Software Engineering*, vol. SE–11, No. 8, pp. 795–810, Aug. 1985.

M. Rusinkiewicz et al., "An Approach to Query Processing in Federated Database Systems," *Proc. of the Twentieth Annual Hawaii Intl' Conf. on System Sciences*, pp. 430–440, 1987.

(List continued on next page.)

*Primary Examiner*—Kevin J. Teska
*Assistant Examiner*—Tyrone V. Walker
*Attorney, Agent, or Firm*—David J. Kappos; Sterne, Kessler, Goldstein & Fox, P.L.L.C.

[57] ABSTRACT

A system and method of pass through in a heterogeneous distributed database environment allows a client to specify syntax that is only understood and processed by a database instance of a back-end server even if it is not understood by an interface module. A hybrid pass through feature provides a combination of both a pass through mode and a native mode allowing statements to be passed through to the database instance or to be processed by the interface module. To accomplish this, a pass through session is established. The scope of the pass through session is defined by statements that establish and terminate the session. Rules determine whether dynamic statements are handled in pass through mode or in native mode based on whether the statements are within or outside of the scope of the pass through session. Input host variable support is provided to database instances that don't otherwise support host variables.

24 Claims, 3 Drawing Sheets

U.S. PATENT DOCUMENTS

| | | | |
|---|---|---|---|
| 5,239,577 | 8/1993 | Bates et al. | 379/201 |
| 5,247,664 | 9/1993 | Thompson et al. | 395/600 |
| 5,257,366 | 10/1993 | Adair et al. | 395/600 |
| 5,278,978 | 1/1994 | Demers et al. | 395/600 |
| 5,280,612 | 1/1994 | Lorie et al. | 395/600 |
| 5,287,537 | 2/1994 | Newmark et al. | 395/800 |
| 5,301,302 | 4/1994 | Blackard et al. | 395/500 |
| 5,333,314 | 7/1994 | Masai et al. | 395/600 |
| 5,345,587 | 9/1994 | Fehskens et al. | 395/650 |
| 5,381,534 | 1/1995 | Shi | 395/200 |
| 5,412,805 | 5/1995 | Jordan et al. | 395/600 |
| 5,416,917 | 5/1995 | Adair et al. | 395/600 |
| 5,428,782 | 6/1995 | White | 395/650 |
| 5,459,860 | 10/1995 | Burnett et al. | 395/612 |
| 5,572,724 | 11/1996 | Watanabe et al. | 395/616 |
| 5,581,758 | 12/1996 | Burnett et al. | 395/614 |

OTHER PUBLICATIONS

S. Kang et al., "Global Management in Heterogeneous Distributed Database Systems," *Microprocessing and Microprogramming*, vol. 38, pp. 377–384, 1993.

Arbee L.P. Chen, *A Localized Approach to Distributed Query Processing*, Bell Communications Research, Piscataway, N.J., pp. 188–202.

S.M. Deen et al., "Query Decomposition in PRECI*," *Distributed Data Sharing Systems*, Elsevier Science Publishers B.V. (North Holland), pp. 91–103, 1985.

M. Rusinkiewicz et al., "Query Transformation in Heterogeneous Distributed Database Systems," *IEEE*, pp. 300–307, 1985.

COMPUTER PROGRAM PRODUCT FOR A QUERY PASS THROUGH IN A HETEROGENEOUS DISTRIBUTED DATA BASE ENVIRONMENT

This application is a division of application Ser. No. 08/310,799, filed Sep. 29, 1994 (status: pending).

CROSS-REFERENCE TO OTHER APPLICATIONS

The following applications of common assignee contain some common disclosure, and is believed to have an effective filing date identical with that of the present application:

U.S. patent application entitled "Functional Compensation In a Heterogeneous, Distributed Database Environment", Ser. No. 08/314,644.

U.S. patent application entitled "Performance Optimization in a Heterogenous, Distributed Database Environment", Ser. No. 08/314,643 now abandoned.

U.S. patent application entitled "Push Down Optimization in a Distributed, Multi-Database System", Ser. No. 08/310,797, now U.S. Pat. No. 5,588,150.

The above-listed applications are incorporated herein by reference in their entireties.

TECHNICAL FIELD

The present invention relates generally to computer database systems, and more particularly to pass through in a heterogeneous, distributed database environment.

BACKGROUND ART

In modern data processing environments, a client's data is often distributed among a plurality of heterogeneous database systems. "Heterogeneous database systems" are database systems that have different data definition and manipulation procedures, security procedures, system management approaches, capabilities, etc. Examples of "heterogeneous database systems" include DB2 produced by International Business Machines (IBM) Corporation, Oracle produced by Oracle Corporation, Sybase produced by Sybase, Inc. etc. Such heterogeneous database systems, when used together, collectively represent a heterogeneous, distributed database environment (or system). Heterogeneous, distributed database systems are also sometimes called federated database systems and/or multi-database systems.

In order to enhance user-friendliness, it is preferred that clients be provided with a common interface to all of the heterogeneous database systems (also called back-end servers, back-end database systems, or simply back-ends). In other words, it is preferred that clients be under the illusion that they are interacting with a single back-end database system.

One conventional approach for achieving this goal is to introduce an interface module between the clients and the back-end database systems. This interface module, also called database middleware attempts to provide to clients transparent access to the back-end database systems. One example of the interface module is IBM DataJoiner. Generally speaking, the interface module receives data definition and manipulation instructions from clients. The interface module translates these instructions such that they are understandable to the appropriate back-end database systems, and then transfers the translated instructions to the appropriate back-end database systems. Similarly, the interface module translates information and messages received from the back-end database systems such that they are understandable to the appropriate clients, and then transfers the translated information and messages to the appropriate clients.

DISCLOSURE OF INVENTION

The present invention is directed toward a system and method of pass through in a heterogeneous distributed database environment. Pass through allows a client, and more specifically a client application, to specify syntax that is only understood and processed by a back-end server. This syntax need not be understood by the interface module.

The invention provides for a hybrid pass through feature. This hybrid pass through feature is a novel combination of both a pass through mode and a native mode.. In the pass through mode, dynamic statements (e.g., SQL statements) containing syntax not understood by the interface module are passed through to the back-end server. In native mode, statements having syntax understood by the interface module, as well as all static statements are processed by the interface module.

According to the invention, a pass through session is established. The scope of the pass through session is defined by statements that establish and terminate the session. Rules are established to determine whether dynamic statements are handled in pass through mode or in native mode based on whether the statements are within or outside of the scope of the pass through session. It is through these rules that the hybrid pass through feature is enabled.

The invention also provides input host variable support to back-end servers that do not otherwise support input host variables. According to this aspect of the invention, when the interface module encounters a statement calling for host variables in the pass through mode, and the pass through is to a back-end that does not support host variables, the interface module looks for any USING statements, such as EXECUTE USING, within that pass through session. When a USING statement is encountered, the interface module rewrites the statement containing the host variables to replace the host variables with the literal values.

Further features and advantages of the present invention, as well as the structure and operation of various embodiments of the present invention, are described in detail below with reference to the accompanying drawings.

BRIEF DESCRIPTION OF DRAWINGS

The present invention is described with reference to the accompanying drawings. In the drawings, like reference numbers indicate identical or functionally similar elements. Additionally, the left-most digit of a reference number identifies the drawing in which the reference number first appears.

BEST MODE OF CARRYING OUT THE INVENTION

1. Overview of the Present Invention

For illustrative purposes, the present invention is sometimes described herein using well known SQL concepts, statements, and syntax. As will be appreciated, SQL (structured query language) is a well known database language originally developed by International Business Machines (IBM) Corporation, and now supported by many relational database vendors, and defined by various standards bodies, such as the American National Standards Institute (ANSI). It should be understood, however, that reference is made to SQL for convenience purposes only. The present invention is intended and adapted to operate with database management systems which do not support SQL.

Figure 1:
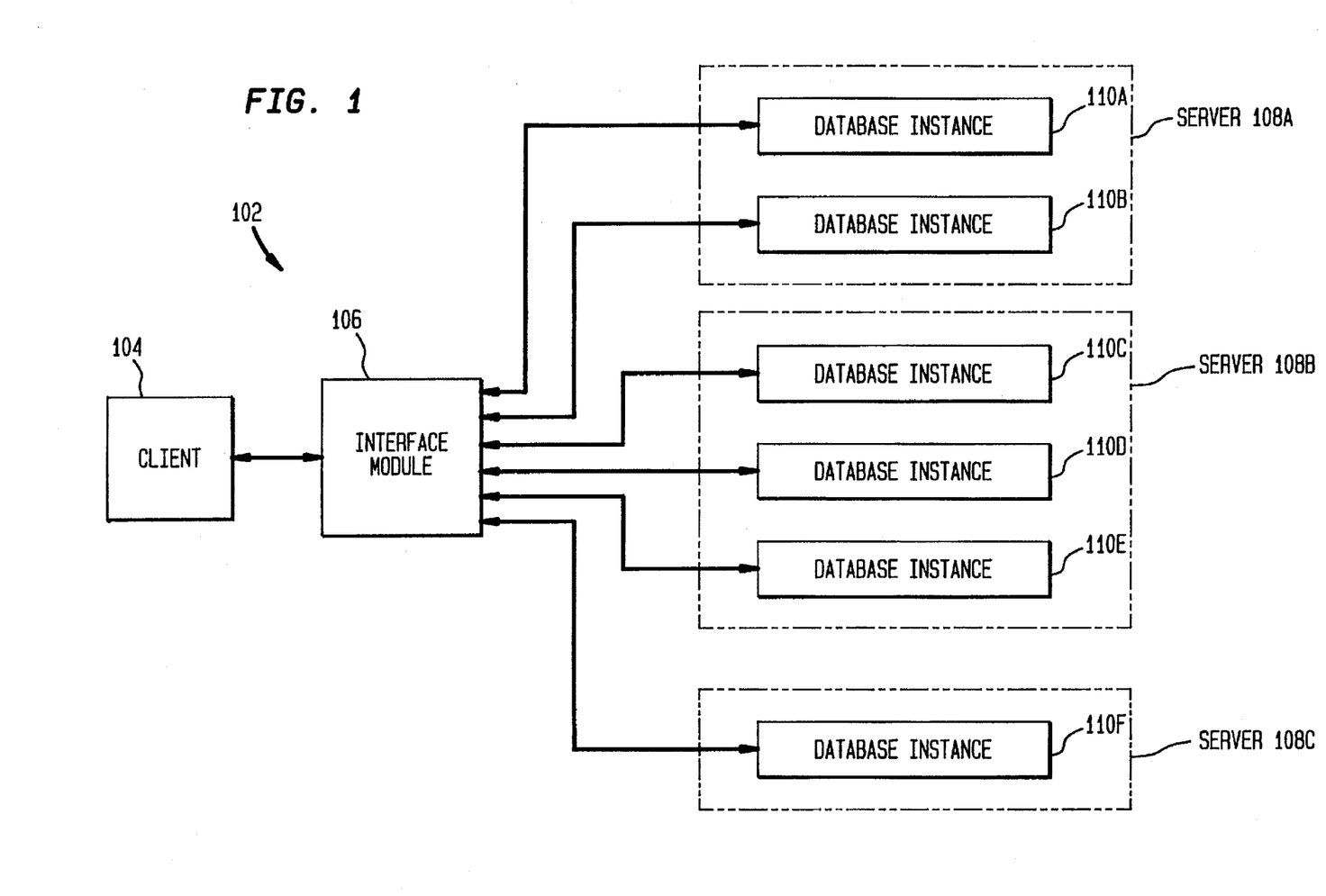
FIG. 1 is a block diagram illustrating a heterogeneous, distributed database system according to a preferred embodiment of the present invention.

FIG. 1 is a block diagram of a heterogeneous, distributed database system 102 according to a preferred embodiment of the present invention. The heterogeneous, distributed database system 102 includes one or more client application processes (also called, simply, "clients"), collectively represented by client 104.

Client 104 is connected to a plurality of instances of back-end database management systems (DBMS) (such as database instances 110A–110F) via a interface module 106, which is also called an interface module and/or database middleware. The database instances 110A–110F represent instantiations of a plurality of heterogeneous database management systems, such as DB2 produced by International Business Machines (IBM) Corporation, Oracle produced by Oracle Corp., Sybase produced by Sybase, Inc., as well as other relational DBMS. Such heterogeneous database management systems may also include non-relational DBMS, flat files, etc.

The database instances 110A–110F (referred to generally as database instances 110) execute on a plurality of servers 108A–108C (referred to generally as servers 108). In the example of FIG. 1, database instances 110A and 110B execute on server 108A, database instances 110C, 110D, and 110E execute on server 108B, and database instance 110F executes on server 108C.

The interface module 106 provides clients 104 with a common interface to all of the database instances 110 (i.e., all of the back-end database systems). By operation of the interface module 106, the clients 104 are placed under the illusion that they are interacting with a single back-end database system.

Generally, the database instances 110 support different sets of functions (more precisely, the database management systems from which the database instances 110A–110F were instantiated support different sets of functions). For example, database instances 110A and 110B may support functions that are not supported by database instances 110C–110F.

According to one implementation of the present invention, the interface module 106 compensates for such functional deficiencies (i.e., the interface module 106 performs functional compensation). Specifically, the interface module 106 simulates the existence of certain functions in database instances 110A–110F that are instantiated from database management systems that do not natively support such functions.

Because the database instances 110 support different sets of functions, and because not all of the functions are supported by the interface module 106, it is desirable to pass through each function not supported by interface module 106 to the appropriate database instance 110 that supports that function. The present invention provides this pass through capability. According to the invention, the pass through provided operates as a hybrid pass through. That is, within a series of commands (or code lines), statements that cannot be processed by the interface module 106 are passed through to the appropriate database instance 110, while those that can be processed by the interface module 106 are not passed through. Further according to the invention, the interface module 106 allows input host variables to be rewritten and passed through as literals to database instances 110 that do not support host variables.

2. Preferred Structure of the Present Invention

Figure 2:
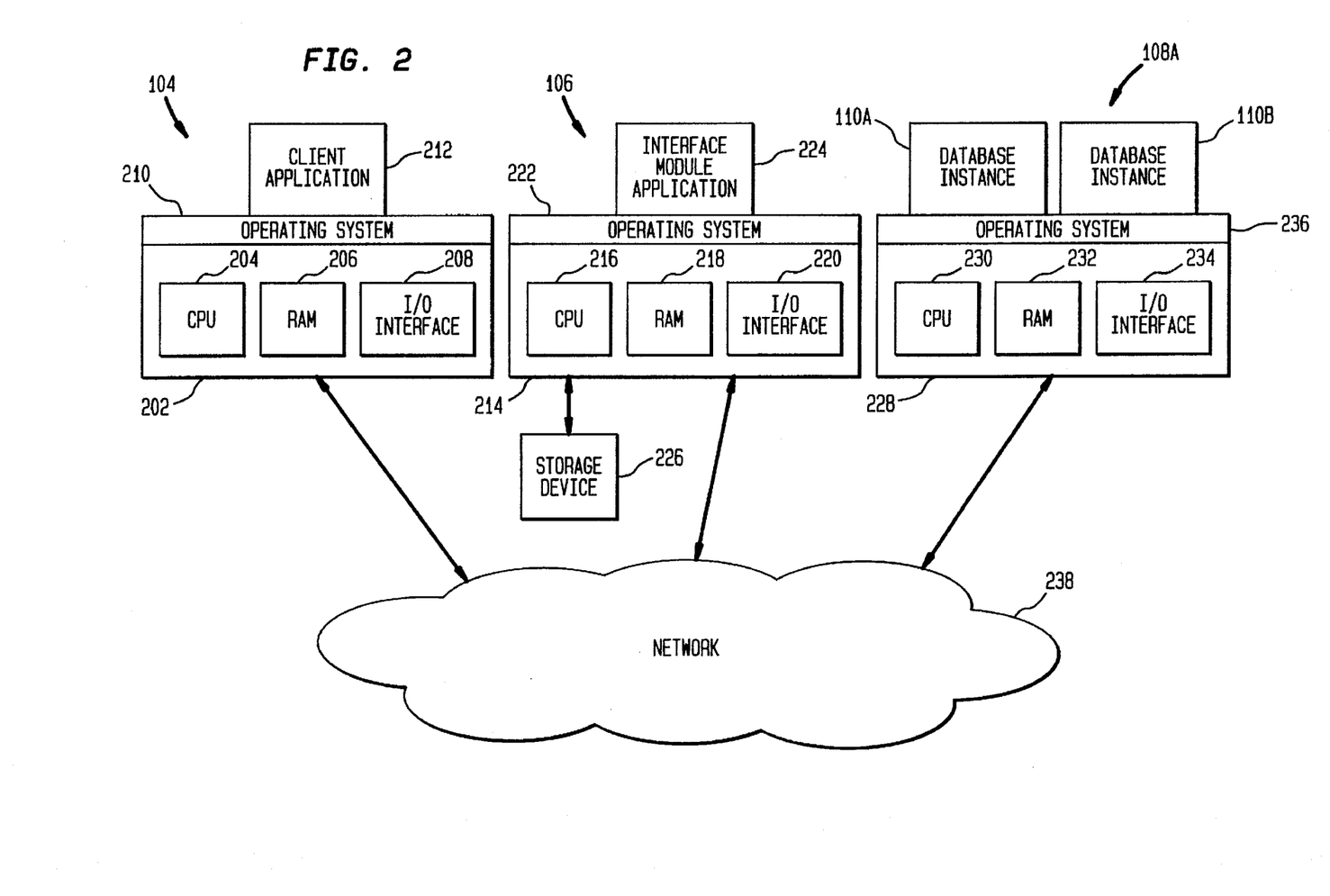
FIG. 2 is a block diagram illustrating the system of FIG. 1 in greater detail.

Referring to FIG. 2, the client 104 is preferably implemented as a client application program 212 operating on a computer platform comprising a computer 202 and an operating system 210. The computer 202 includes various hardware components, such as one or more central processing units (CPU) 204, a random access memory (RAM) 206, and an input/output (I/O) interface 208. The client application program 212 includes instructions for defining and manipulating data in databases maintained by the database instances 110A–110F. The operating system 210 may be implemented using any well known operating system suitable for executing the client application program 212, such as DOS, DOS/Windows, AIX, OS/2, HP-UX, and Sun OS. The computer 202 may be implemented using any well known computers that support these operating systems. It should be understood, however, that other computers and operating systems could alternatively be used without departing from the scope and spirit of the present invention.

The interface module 106 is preferably implemented as a interface module application program 224 (preferably written in the C computer programming language) operating on a computer platform comprising a computer 214 and an operating system 222. The interface module application program 224, when executed, enables the computer 214 to perform the features of the interface module 106 discussed herein. Thus, the interface module application program 224 could be considered a controller of the computer 214.

The computer 214 includes various hardware components, such as one or more central processing units (CPU) 216, a random access memory (RAM) 218, and an input/output (I/O) interface 220.

Preferably, the computer 214 is the well known RISC System/6000 family of computers produced by IBM. Alternatively, the computer 718 is any computer that can run DB2 (produced by IBM). The operating system 726 is preferably the well known AIX operating system produced by IBM. It should be understood, however, that other computers and operating systems could alternatively be used without departing from the scope and spirit of the present invention.

The computer 214 is connected to a number of peripheral devices, such as one or more storage devices. The storage devices may represent floppy drive units, hard drive units, tape backup units, etc. One such storage device, designated using reference number 226, is shown in FIG. 2. A computer program product comprising a computer readable media having computer program logic recorded thereon, wherein the computer program logic when executed in the computer 214 enables the computer 214 to perform the functions of the present invention, may be read by and/or stored on the storage device 226. The computer program logic may then be loaded into the RAM 218, and executed by the CPU 216 of the computer 214. When executing in the CPU 216, the computer program logic is represented by the interface module application program 224 as shown in FIG. 2.

As stated above, the database instances 110A–110F execute on a plurality of servers 108A–108C. Server 108A is shown in FIG. 2 (servers 108B and 108C are similar to server 108A). The server 108A is preferably implemented as a computer platform comprising a computer 228 and an operating system 236. The computer 228 includes various hardware components, such as one or more central processing units (CPU) 230, a random access memory (RAM) 232, and an input/output (I/O) interface 234. The operating system 210 may be implemented using any well known operating system suitable for executing the database instances 110A and 110B, such as MVS, VM, VSE, OS/400, OS/2, AIX, HP-UX, SUN OS, etc. The computer 228 may be implemented using any well known computers that support these operating systems. It Should be understood, however, that other computers and operating systems could alternatively be used without departing from the scope and spirit of the present invention.

The computers 202, 214, and 228 are connected to a communication network 238, which may be implemented as a local area network (LAN) or a wide area network (WAN), for example. The client 104, interface module 106, and database instances 110A–110F communicate with each other over this network 238.

3. Pass Through Functionality

As stated above, in many implementations of heterogeneous distributed database system 102, not all database instances 110 support the same functions. More specifically, not all database instances 110 can process all SQL statements. Similarly, in one implementation, interface module 106 cannot process every SQL statement that is in client application code 212. As a result, each SQL statement not supported by interface module 106 must be "passed through" interface module 106 to the appropriate database instance 110A–110F capable of processing that statement. This functionality is referred to as "pass through."

Pass through permits client 104 to use DBMS features that are supported only by a database instance 110. Pass through further permits client 104 to create objects tables, views, and so forth) on a database instance 110. In other words, pass through allows the client application 212 to specify SQL syntax that is only understood by the database instance 110. Interface module 106 functions as a pipe to transport the SQL statement to the database instance 110 to be processed.

There are several SQL statements that can be specified by users to manipulate the SQL statement that is to be passed through to the database instance 110. These can include PREPARE, DESCRIBE, EXECUTE, EXECUTE IMMEDIATE, OPEN, FETCH, and CLOSE.

At a high level, the basic concept of pass through is not new. However, the present invention provides several novel and unique features. One such feature provided is a hybrid pass through. According to this hybrid feature, client 104 can exploit the functionality of interface module 106 as well as that of the database instances 110.

To accomplish this, the invention permits a user (or a client application 212) to define a pass through session. The invention further provides the flexibility within the scope of a pass through session to specify statements that are to be processed by a database instance 110 in "pass-through" mode and to specify statements that are to be processed by interface module 106 in what is called "native" mode.

A pass through session is defined by two SQL statements. The first statement initiates the pass through session, and the second statement signifies the end of the pass through session. These statements are "SET PASSTHRU server-name" and "SET PASSTHRU RESET," respectively. Thus, "SET PASSTHRU server-name" establishes a pass through session to the specified database instance 110, and "SET PASSTHRU RESET" terminates the pass through session.

A rudimentary example of a pass through session with an SQL statement to be processed by a database instance 110 is now provided. In this example, client application 212 wants an ORACLE server to insert values defined by the variable 'A' into a table named "TAB1."

1 strcpy (p1, "SET PASSTHRU ORACLE");
2 EXEC SQL EXECUTE IMMEDIATE: p1;
3 Strcpy(s1,"INSERT INTO TAB1 VALUES ('A')");
4 EXEC SQL PREPARE STMT1 from :s1;
5 EXEC SQL EXECUTE STMT1;
6 strcpy(p1,"SET PASSTHRU RESET");
7 EXEC SQL EXECUTE IMMEDIATE :p1;

According to this example, statements 4 and 5, the PREPARE and EXECUTE statements, fall within the scope of the pass through session and are therefore handled in pass through mode by the Oracle database instance 110. If, on the other hand, statement 4 was outside the scope of the pass through session (i.e., before SET PASSTHRU ORACLE, or after SET PASSTHRU RESET), the EXECUTE statement would be handled in native mode by interface module 106.

To enable hybrid pass through, which allows statements to be processed by either the interface module 106 or the a database instance 110, several rules have been established in a preferred environment. These rules are as follows:

R1 A section PREPAREd and EXECUTEd within the scope of a pass through session is handled in pass through mode;

R2 A section PREPAREd prior to the scope of a pass through session and EXECUTEd within the scope of the pass through session is handled in native mode;

R3 A section PREPAREd within the scope of a pass through session but EXECUTEd outside the scope of the pass through session receives an error; and R4 A static SQL statement is always handled in native mode.

Thus, in the example illustrated above, because the section is PREPAREd and EXECUTEd within the scope of a pass through session, it is handled in pass through mode. Rules R1-R3 also apply to OPEN, CLOSE and FETCH statements used in conjunction with a corresponding PREPARE statement.

Note that according to rule R4 above, static statements are always handled in native mode. Dynamic statements, on the other hand, are handled according to rules R1 through R3. Dynamic statements are those statements that are prepared and executed within an application program while the program is executing. OPEN, FETCH and CLOSE statements can be either static or dynamic. If used in conjunction with a PREPARE statement, the OPEN, FETCH, or CLOSE statement is dynamic. If used by itself, the OPEN, FETCH, or CLOSE statement is static.

Figure 3:
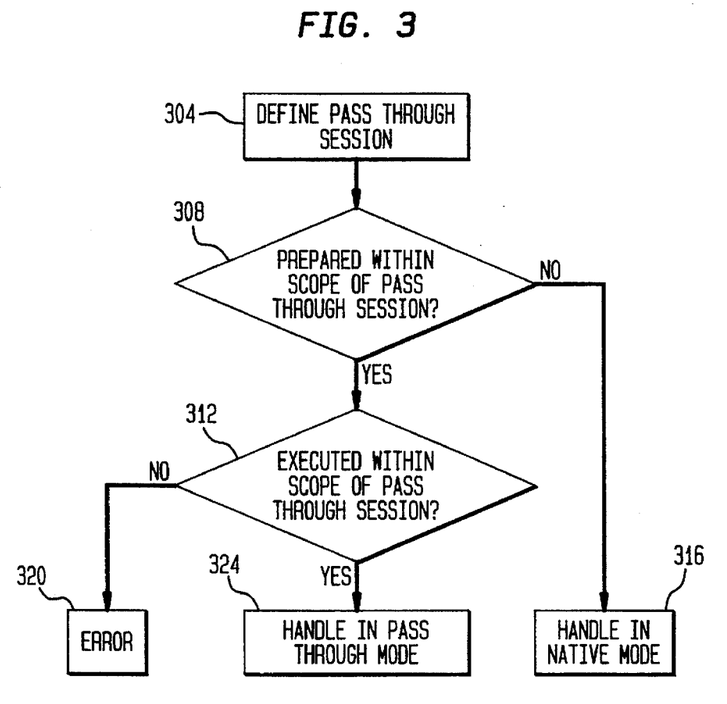
FIG. 3 is an operational flow diagram illustrating hybrid pass through according to one embodiment of the invention.

FIG. 3 illustrates these rules and how they are applied to determine whether a dynamic statement is handled in pass through or native mode. Referring now to FIG. 3, in a step 304, a pass through session is defined. As described above, a pass through session is defined by the a "SET PASSTHRU server-name" statement and "SET PASSTHRU RESET" statement.

In a step 308, it is determined whether the section is PREPAREd within the scope of the pass through session.

Specifically, it is determined whether the PREPARE statement falls after a "SET PASSTHRU server-name" statement but before the next "SET PASSTHRU RESET" statement. If the section is PREPAREd prior to the scope of the pass through session and EXECUTEd within the scope of a pass through session, in a step 316 it is handled in native mode.

If the statement is PREPAREd within the scope of the pass through session (step 308) but is not EXECUTEd within such scope (step 312), in a step 320 an error occurs. If the statement is PREPAREd within the scope of the pass through session (step 308) and is EXECUTEd within such scope (step 312), it is handled in pass through mode in step 324.

The following example, which is part of a client application program 212, is used to further illustrate these rules. The example is written roughly in the form of SQL statements embedded in C code.

```
1 strcpy(s1, "INSERT INTO ALIAS_T1 VALUES
    ('PEAR') ");
2 EXEC SQL PREPARE STMT1 FROM :s1;
3 strcpy (p1,"SET PASSTHRU NY_ORACLE7");
4 EXEC SQL EXECUTE IMMEDIATE :p1;
5 EXEC SQL EXECUTE STMT 1;
6 strcpy(s2,"CREATE TABLE T1 (C1 CHAR(5))")";
7 EXEC SQL EXECUTE IMMEDIATE :s2;
8 EXEC SQL UPDATE ALIAS T1 SET C1='Apple'
    where C1='Peach';
9 strcpy(p1,"SET PASSTHRU RESET");
10 EXEC SQL EXECUTE IMMEDIATE :p1;
11 EXEC SQL INSERT INTO ALIAS_T1 VALUES
    ('Mango');
```

Statements 3, 4, 9 and 10 define the scope of the pass through session to a back-end known as NY_ORACLE7. Statements 2 and 5 describe a section that is to be performed in native mode because the section was PREPAREd prior to the scope of the pass through session.

Statement 7, the EXECUTE IMMEDIATE statement is handled in pass through mode. This is because the EXECUTE IMMEDIATE statement, which is treated as a PREPARE and an EXECUTE statement in one statement, occurs within the scope of the pass through.

Statement 8 is a static statement and is therefore handled in native mode.

Statement 11 is outside the scope of the pass through session and is therefore handled in native mode.

Note that in one embodiment, nesting of pass through sessions is not allowed. That is, a pass through session cannot be established to a database instance 110 that is different from a database instance 110 to which a pass through session already exists. In an alternative embodiment, nesting of pass through sessions is acceptable.

4. Host Variable Support

A host variable is a variable in a client application program (in a host computer language such as C, Fortran, Cobol, Assembler, etc.) that is referred to in a database statement, such as a SQL statement. Host variables are so named because they are defined by statements of the host language.

Not all database management systems provide application programming interfaces that support host variables. Therefore, a feature provided by the invention is the ability to manipulate an SQL statement that is being processed by a database instance 110 through interface module application programming interfaces. This allows the usage of such features as input host variables even if they are not supported by the database instance 110 that is processing the statement.

One example of where this feature is useful is when Sybase database instance 110 is being used. Sybase's Open Client DB-Library application programming interfaces do not support host variables. When using these application program interfaces, all values must be provided to the Sybase back-end server for execution. In one embodiment of the invention, input host variables are specified with the keyword USING in both OPEN and EXECUTE SQL statements.

To illustrate this feature in detail, consider the following example. In this example, the client 104 wants to build a table TAB1 using values defined by a host variable H0.

```
1 strcpy(p1, "SET PASSTHRU SYBASE");
2 EXEC SQL IMMEDIATE :p1;
3 Strcpy(s1,"INSERT INTO TAB1 VALUES (:H0)");
4 EXEC SQL PREPARE STMT1 from : S1;
5 strcpy (H0., "A");
6 EXECUTE STMT1 USING :H0;
7 strcpy (H0, "B");
8 EXECUTE STMT1 USING :H0;
9 strcpy (p1, "SET PASSTHRU RESET");
10 EXEC SQL EXECUTE IMMEDIATE: p1;
```

In this example, statement 5 in the C programming language sets variable H0 to A. When interface module 106 encounters statement 6, the EXECUTE statement within the scope of the pass through session, it effectively hardcodes the value 'A' (i.e., what H0 is set equal to) for the "H0" in statement 3. Thus, a value is substituted for the variable by interface module 106 and passed through to Sybase. As a result, host variables can now be supported by Sybase.

Note that statements 7 and 8 accomplish the same thing as statements 5 and 6, but substitute the value "B" for the "H0" in statement 3. If desired, the PREPARE statement can be EXECUTEd several times with new values substituted for the host variable.

Figure 4:
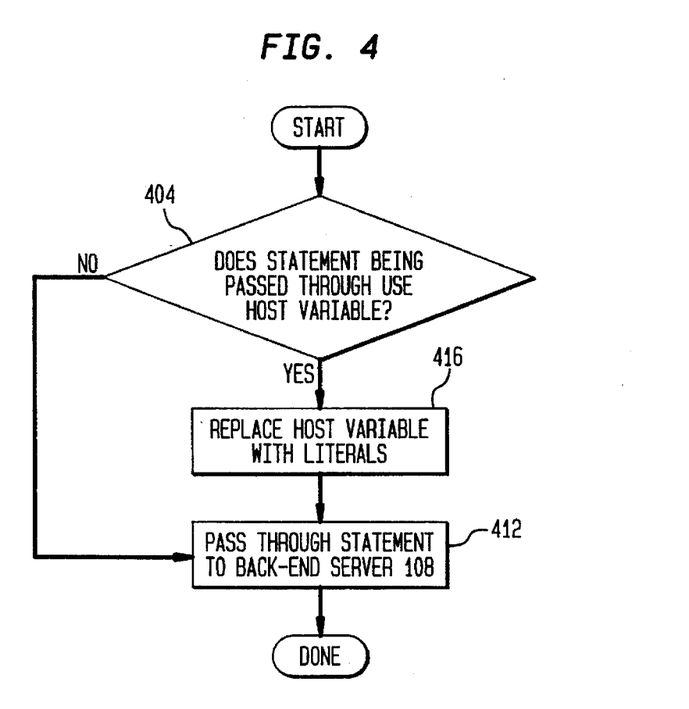
FIG. 4 is an operational flow diagram illustrating host variable pass through according to one embodiment of the invention.

FIG. 4 is a flow chart illustrating the manner in which input host variable support is provided when not supported by a database instance 110. In a step 404, if a statement to be passed through does not require inputhost variables, that statement can be passed through to the appropriate database instance 110 in a step 412 provided all other pass through rules are satisfied.

If, instead, input host variables are specified, in a step 416, the interface module 106 replaces the host variable with the literal defined by the USING statement. Now, in step 412, the statement can be passed through to the database instance 110 to execute the statement with the literal substituted for the host variable.

Because pass through according to the invention allows database instance 110 to handle host variables, interface module 106 now provides as much functionality and consistency as possible.

Another feature of the invention that is related to host variables is that of data type translation. For input host variables, the interface module data type is translated to the database instance 110 data type. For output host variables, the database instance 110 data type is converted to the interface module 106 data type.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A program storage device readable by a machine, embodying a program of instructions executable by the machine to perform method steps for performing pass through in a multi-system environment, said method steps comprising the steps of:

defining a scope of a pass through session using an initiate statement to establish said pass through session and a reset statement to terminate said pass through session;

handling a statement in a pass through mode if said statement falls within said scope of said pass through session; and handling said statement in a native mode if said statement is outside of said scope of said pass through session;

wherein statements received subsequent to said initiate statement and prior to said reset statement are handled in said pass through mode; and wherein said statement is not processed by said machine in pass through mode.

2. The program storage device of claim 1, wherein said step of handling said statement in said pass through mode is only performed if said statement is dynamic, and wherein all static statements are handled in said native mode.

3. The program storage device of claim 1, wherein said statement falls within said scope of said pass through session if said statement is prepared and executed after said initiate statement and before said reset statement.

4. The program storage device of claim 1, wherein said statement is outside said scope of said pass through session if said statement is prepared prior to said initiate statement.

5. The program storage device of claim 1, further comprising the step of issuing an error if said statement is prepared within said scope of said pass through session but executed outside said scope of said pass-through session.

6. The program storage device of claim 1, further comprising the step of hardcopying a literal in place of an input host variable in a statement being handled in said pass through mode.

7. A computer program product for use with a data processing system, the data processing system comprising a database instance running in a first computer system, an application process running in a second computer system and having a statement to be executed by said database instance, and an interface module configured to interface said first computer system with said second computer system and to pass said statement to said database instance for execution, said computer program product comprising:

a computer usable medium having computer readable program code means embodied in said medium for causing the data processing system to perform pass through in said data processing system, said computer readable program code means comprising:

computer readable program code means for defining a scope of a pass through session using an initiate statement to establish said pass through session and a reset statement to terminate said pass through session;

computer readable program code means for handling a statement in a pass through mode if said statement falls within said scope of said pass through session; and computer readable program code means for handling said statement in a native mode if said statement is outside of said scope of said pass through session;

wherein statements received subsequent to said initiate statement and prior to said reset statement are handled in said pass through mode; and wherein said statement is not processed by said interface module in pass through mode.

8. The computer program product of claim 7, wherein said computer readable program code means for handling said statement in said pass through mode only handles said statement in said pass through mode if said statement is dynamic, and wherein all static statements are handled in said native mode.

9. The computer program product of claim 7, wherein said statement falls within said scope of said pass through session if said statement is prepared and executed after said initiate statement and before said reset statement.

10. The computer program product of claim 7, wherein said statement is outside said scope of said pass through session if said statement is prepared prior to said initiate statement.

11. The computer program product of claim 7, wherein said computer readable program code means further comprises computer readable program code means for issuing an error if said statement is prepared within said scope of said pass through session but executed outside said scope of said pass-through session.

12. The computer program product of claim 7, wherein said computer readable program code means further comprises computer readable program code means for hardcopying a literal in place of an input host variable in a statement being handled in said pass through mode.

13. A computer program product for use with a data processing system, the data processing system comprising a plurality of database servers having processor and a RAM and being capable of supporting one or more database instances, one or more client servers having a processor and a RAM and running an application program, and an interface module having a processor and a RAM and running an interface module application to interface said database servers to said client servers, wherein at least one of said database instances adapted to support application program syntax not supported by said interface module application, said computer program product comprising:

a computer usable medium having computer readable program code means embodied in said medium for causing the data processing system to pass said syntax to said at least one of said database instance, said computer readable program code means comprising:

computer readable program code means for defining a scope of a pass through session using an initiate statement to establish said pass through session and a reset statement to terminate said pass through session;

computer readable program code means for handling a statement in a pass through mode if said statement falls within said scope of said pass through session; and computer readable program code means for handling said statement in a native mode if said statement is outside of said scope of said pass through session;

wherein statements received subsequent to said initiate statement and prior to said reset statement are handled in said pass through mode; and wherein said statement is not processed by said interface module application in pass through mode.

14. The computer program product of claim 13, wherein said computer readable program code means further comprises computer readable program code means for handling all static statements in said native mode.

15. The computer program product of claim 13, wherein said computer readable program code means further comprises computer readable program code means for issuing an error if said statement is prepared within said scope of said pass through session but executed outside said scope of said pass through session.

16. The computer program product of claim 13, wherein said computer readable program code means further comprises computer readable program code means for hardcopying a literal in place of an input host variable in a statement being handled in said pass through mode.

17. A program storage device readable by a machine, embodying a program of instructions executable by the machine to perform method steps for interfacing a client server running an application program to one or more data base servers, said method steps comprising the steps of:

defining a scope of a pass through session using an initiate statement to establish said pass through session and a reset statement to terminate said pass through session;

handling a statement in a pass through mode if said statement falls within said scope of said pass through session; and handling said statement in a native mode if said statement is outside of said scope of said pass through session;
   wherein statements received subsequent to said initiate statement and prior to said reset statement are handled in said pass through mode; and
   wherein said statement is not processed by said machine in pass through mode.

18. The program storage device of claim 17, further comprising the step of handling all static statements in said native mode.

19. The program storage device of claim 17, further comprising the step of issuing an error if said statement is prepared within said scope of said pass through session but executed outside said scope of said pass through session.

20. The program storage device of claim 17, further comprising the step of hardcopying a literal in place of an input host variable in a statement being handled in said pass through mode.

21. A computer program product for use with a computer system, said computer program product comprising:

a computer usable medium having computer readable program code means embodied in said medium for enabling the computer system to provide a hybrid pass through among a client and a database server, said computer readable program code means comprising:

computer readable program code means for defining a scope of a pass through session using an initiate statement to establish said pass through session and a reset statement to terminate said pass through session;

computer readable program code means for handling a statement in a pass through mode if said statement falls within said scope of said pass through session; and computer readable program code means for handling said statement in a native mode if said statement is outside of said scope of said pass through session;
   wherein statements received subsequent to said initiate statement and prior to said reset statement are handled in said pass through mode; and
   wherein said statement is not processed by said computer system in pass through mode.

22. The computer program product of claim 21, further comprising computer readable program code means for handling all static statements in said native mode.

23. The computer program product of claim 21, further comprising computer readable program code means for issuing an error if said statement is prepared within said scope of said pass through session but executed outside said scope of said pass through session.

24. The computer program product of claim 21, further comprising computer readable program code means for hardcopying a literal in place of an input host variable in a statement being handled in said pass through mode.

* * * * *